United States Patent [19]

Babel

[11] Patent Number: 4,920,632
[45] Date of Patent: May 1, 1990

[54] AUXILIARY MAGAZINE FOR ELECTRONICALLY-DRIVEN MACHINE TOOLS

[75] Inventor: Werner Babel, Pfronten, Fed. Rep. of Germany

[73] Assignee: MAHO Aktiengesellschaft, Fed. Rep. of Germany

[21] Appl. No.: 280,004

[22] Filed: Dec. 5, 1988

[30] Foreign Application Priority Data

Dec. 4, 1987 [DE] Fed. Rep. of Germany ... 8716086[U]

[51] Int. Cl.$^5$ ............................................ B23Q 3/155
[52] U.S. Cl. ....................................... 29/568; 211/1.5
[58] Field of Search ............................. 29/568; 211/1.5

[56] References Cited

U.S. PATENT DOCUMENTS

| 4,620,363 | 11/1986 | Mitsukuchi et al. | 29/568 |
| 4,622,734 | 11/1986 | Kolblin et al. | 29/568 |

FOREIGN PATENT DOCUMENTS

| 3331293 | 3/1984 | Fed. Rep. of Germany. | |
| 3607391 | 9/1987 | Fed. Rep. of Germany. | |
| 58-120441 | 7/1983 | Japan | 29/568 |
| 58-181537 | 10/1983 | Japan | 29/568 |
| 58-186543 | 10/1983 | Japan | 29/568 |
| 59-30636 | 2/1984 | Japan | 29/568 |
| 63-123646 | 5/1988 | Japan | 29/568 |
| 255746 | 4/1970 | U.S.S.R. | 29/568 |

Primary Examiner—Daniel Howell
Attorney, Agent, or Firm—Baker, Maxham, Jester & Meador

[57] ABSTRACT

An auxiliary magazine for electronically-driven machine tools which greatly increases the efficiency and tool magazine capacity of the machine tool. A separate unit has revolving chain tool storage units adapted to integrate, through a guide shoe, with the machine-native magazine.

7 Claims, 1 Drawing Sheet

U.S. Patent
May 1, 1990
4,920,632
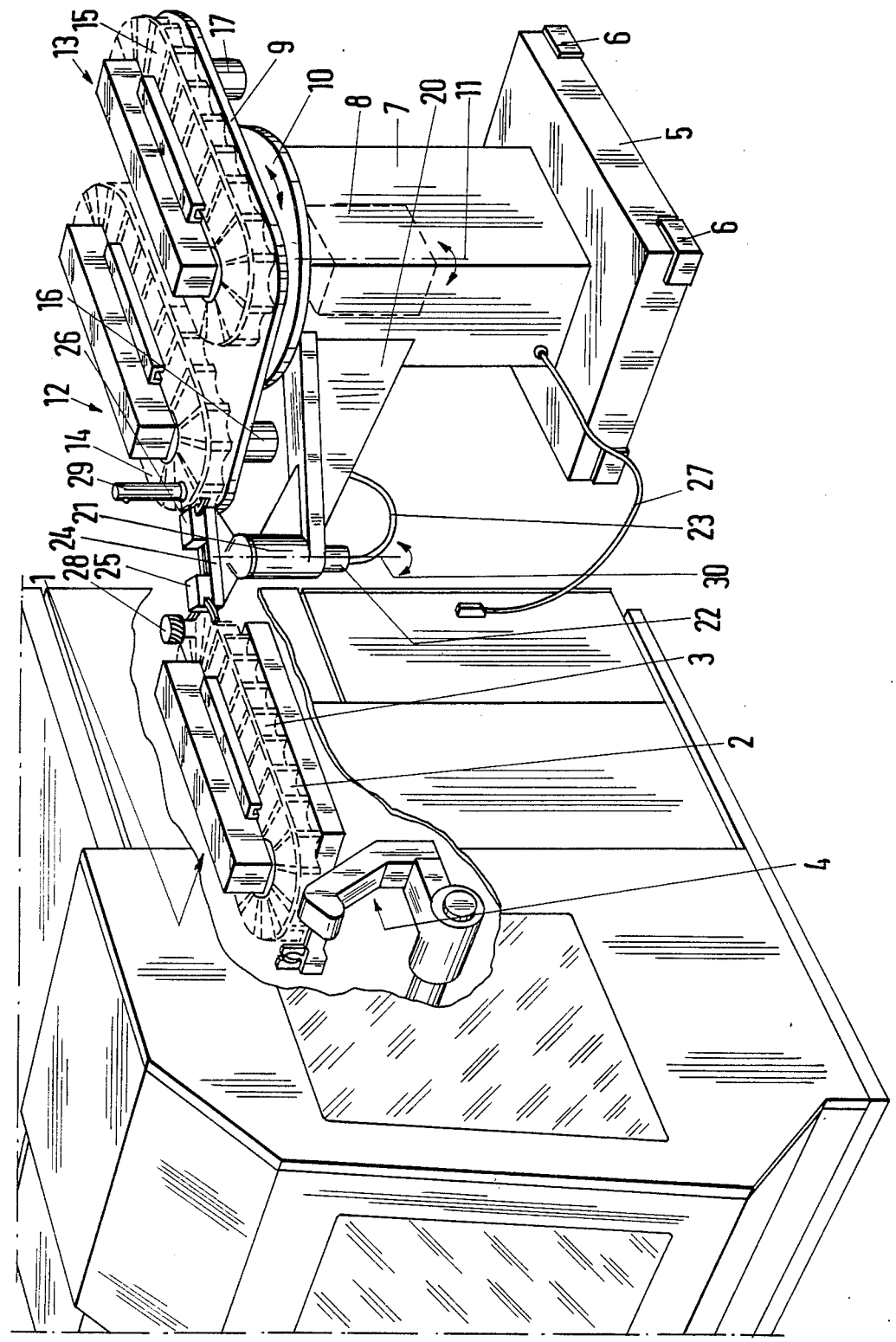

AUXILIARY MAGAZINE FOR ELECTRONICALLY-DRIVEN MACHINE TOOLS

FIELD OF THE INVENTION

The invention involves an auxiliary magazine for electronically-driven machine tools—particularly for cutting and drilling centers—and features a front end column on which are mounted at least one chain- and-/or plate-shaped tool magazine with an electronically controlled motor, and a tool exchanger with two mechanically adjustable tongs.

BACKGROUND OF THE INVENTION

In recent years, a large number of various machining centers have been developed for finishing both large and small series of complicated workpieces. The tool magazines of these machining centers can potentially contain a larger number of tools. The large storage capacity of the tool magazine makes possible a correspondingly large number of various finishing procedures for the same or different workpieces, without requiring manual intervention in the finishing process. However, the capital investment required for these complex machining centers and the amount of space they themselves (and especially their magazines) take up, have proven disadvantageous. Although electronically-driven universal cutting and drilling machining tools—suited for automatic finishing of even complex workpieces on account of their fixed chain drives and digital control mechanisms—have become known, the number of single, independently running finishing operations which can be accomplished with these machine tools has been limited by the reduced capacity of their tool magazines. An increase in the intake capacity of the tool magazine would result in both increased capital expenditures and an increase in the overall size of the machine tool.

German patent publication No. 36 07 391 describes a tool trolley for transporting a tool magazine among analog-driven machine tools. The tool trolley, which can also fulfill the function of an auxiliary magazine, features both a tool storage area in the form of a revolving chain with tool uptake points, and a tool exchanger with movable tongs for transporting a selected tool back and forth between the tool storage unit to the machine's tool magazine. A horizontally and vertically adjustable carriage, which bears the tool storage area on its vertical outer side and the tool exchanger on its horizontal upper side, is located on the plate-shaped trolley carrier. The tool exchanger features a support which adjusts horizontally and diagonally relative to the carriage, as well as an elbow joint carrier which can be revolved along a diagonal axis and which features two diametrically opposed grip arms with tongs mounted on them. Although this well-known tool trolley can also be used as an auxiliary magazine, it was developed primarily for the transport of several finishing machines together with their tools. From the point of view of construction, the aforementioned tool trolley is rendered wasteful by, among other things, the various aggregate drives and the way in which they are controlled.

German patent publication No. 33 31 293 describes a tool exchange construction setup for a machining tool, which features a revolving plate-shaped main magazine with a large number of tool cartridges and, next to the main magazine, a revolving plate-shaped auxiliary magazine mounted on a trolley. With the help of thrust cylinders, the cartridges containing the tools are transported back and forth from the main magazine into empty spaces of the auxiliary magazine. This familiar setup is also technologically wasteful and possesses only a limited storage capacity.

SUMMARY OF THE INVENTION

A primary task of the present invention is to create an auxiliary magazine for electronically-driven machine tools, especially for cutting and drilling machines, which, by virtue of its simple technical construction, will make possible both a manifold increase in the capacity of machine-native tool magazines and the loading of tools without necessitating an interruption of operations.

The present invention solves this problem in two ways. The tool exchanger, positioned opposite a tool transfer point on the machine-native magazine tool, features a vertical spar attached to the side of the tool storage area. A guide shoe for the two contrarotatable tongs is mounted on this spar and can be adjusted along a vertical axis. In addition, two independently driven revolving chains with tool uptake points serve as tool storage units, and are mounted side-by-side on a revolving table which, attached to the front end column, can be adjusted along a vertical axis.

The use of two mutually independent revolving chains as tool storage areas, together with the toolexchanger mounted on the aforementioned position of the front end column, makes it possible to exchange tools between one revolving chain and the machine-native tool magazine as required by the current operations program of the machine tool, while simultaneously loading the second revolving chain (mounted on the revolving table) with tools for future finishing operations. After the first finishing cycle has ended, the revolving chain loaded with tools can be moved to the exchange position, that is, within reach of the tool exchanger, by adjusting the revolving table by 180°. In this way, the auxiliary magazine invention not only more than doubles the storage capacity of the machine-native magazine, but also reduces the amount of time previously required for arming the magazine with tools. As a result, the overall efficiency of the machine tool improves substantially.

For the sake of avoiding collisions with the stationary mounted tool exchanger when the revolving table or the two revolving chain tool storage units are moved, the auxiliary magazine is skewed sideways behind the machine tool, so that the machine-native magazine is serviced from behind. This design positions the tool exchanger along an imaginary line connecting the axis of the revolving table and the axis of the revolving chain at the back of the machine-native magazine.

The machine-native magazine can be a chain magazine, a plate magazine or any suitable tool magazine.

BRIEF DESCRIPTION OF THE DRAWING

The objects, advantages and features of the invention will be more readily perceived from the following detailed description when read in conjunction with the single FIGURE of the accompanying drawing showing in perspective a partially cut away machine tool finishing center with the auxiliary magazine structure of the invention.

DETAILED DESCRIPTION OF THE PREFERRED EMBODIMENT

The machine finishing center displayed in the drawing is an electronically driven cutting and drilling center surrounded by a protective housing. Inside the protective housing and to the side of the headstock (not shown) is machine-native tool magazine 1, which features a tool storage unit in the form of revolving chain 2 with tool uptake points 3, as well as two gear wheels (not shown) and an electronically driven motor (not shown). In front of this machine-native tool magazine is tool exchanger 4 for servicing the vertical and/or horizontal workhead (not shown). The term "machine-native tool magazine" refers to the magazine which is originally part of and is integral with the machine tool.

The invention described herein is positioned diagonally behind the finishing center and contains baseplate 5, feet 6 of which permit horizontal adjustments and exact positioning of the magazine relative to the finishing center. Rectilinear column 7 is attached to baseplate 5 and contains aggregate drive 8 for a revolving table 10. When in motion, the revolving table 10 rotates around its axis 11 inside front end column 7. Two identically constructed tool storage unit 12 and 13, respectively consisting of revolving chain 14 and 15, rest on top of platform 9 and are drawn through two gear or chain wheels, each of which is powered by the appropriate aggregate drive 16 or 17. The two tool storage units 12 and 13 are arranged parallel side-by-side and symmetrically to axis 11 of revolving table 10, so that they can take their opposite positions when the table is rotated by 180°.

Horizontal carrying arm 20, which bears vertical hollow cylinder 21 on its free end, is attached to the front wall of front end column 7. Inside hollow cylinder 21 is an aggregate drive 22 which is provided with energy by way of a cable 23. Guide shoe 24, which, powered by aggregate drive 22, can be rotated 180° around axis 30, is located a the upper end of hollow cylinder 21. Atop guide shoe 24, two contrarotatable tool tongs 25 and 26 are mounted. These tongs can move from the illustrated position (far apart from one another) in which each tong can grasp one tool from machine-native magazine 1 and one tool from tool storage unit 12, to a collision position in which each of the two tongs 25 and 26 and the end surfaces facing each other lie pressed together. Each of tongs 25 and 26 contains a local drive for opening and closing the pincers normal to such devices.

The front end column contains driver devices for the aggregate drives 8, 16, 17 and 22, which are connected to the electronic controls of the machine tool by way of cable 27.

Operation of the auxiliary magazine of this invention will now be explained in detail. When tool 28 from machine-native magazine 1 must be exchanged for a different tool 29, appropriate commands carry first tool 28 to the back exchange position of magazine 1, as illustrated by the position of cutting head 28. The pincers of each of the two identically constructed tool tongs 25 and 26 grasp a tool; tong 25 with its wide-angle pincers grasps tool 28 in magazine 1, while tong 26, with its equally wide-angle pincers, grasps tool 29 in tool storage unit 12. As the two tool tongs 25 and 26 simultaneously approach one another, the two tools 28 and 29 are pulled out of their uptake points from revolving chains 2 and 14 respectively. There next occurs a 180° rotation of the guide shoe 24 by means of its driver 22, with the result that tool 29 now faces empty tool uptake point 3 of the machine-native magazine tool 1 and just-used tool 28 now faces empty uptake point 14 in tool storage unit 12. When the two pincers 25 and 26 separate and move outward again into the illustrated position, both tools 28 and 29 are inserted into their respective uptake points and fixed in place. The pincers open and tool storage units 12 and 13 and revolving table 10 can both be rotated. This procedure yields extremely brief tool exchange periods.

While the various exchange operations between tool storage unit 12 and the machine-native magazine tool 1 are proceeding, tool storage unit 13 of the present auxiliary magazine invention can be loaded manually with new tools for future finishing operations. After a finishing cycle has ended, platform 9 on top of revolving table 10 is rotated 180° with the help of its driver 8, so that tool storage unit 13 moves into the position previously occupied by tool storage unit 12, within reach of the tool exchanger. The tools contained in tool storage unit 13 can now be exchanged with the tools in the machine-native magazine in the manner described above.

In the illustrated sample application, the auxiliary machine is positioned diagonally behind the finishing center, and the carrying arm 20 of the tool exchanger is directed toward the imaginary line connecting axis 11 and the axis of the rear chain wheel of machine-native magazine 1. With this arrangement, the tool exchanger is located at a "corner" of the somewhat rectangular (as seen from above) revolving platform 9, whereupon collisions between the tool exchanger with sections of the tool storage units 12 and 13 are avoided when platform 9 is rotated.

The invention is not limited to the sample application here presented. For example, appropriate exchange devices other than the tool exchanger illustrated here can be used, even though the application described in these pages is especially expedient because of its simple technical setup. Moreover, the auxiliary-magazine can feature motorized feet or free-standing rollers instead of the feet in the illustration, so that the auxiliary magazine can, if necessary, service several machines and/or be moved to one or another machine tool when needed. If retractable rollers are added to feet 6 in the illustration, they make possible both an advantageous mobility and, simultaneously, an exact and stable positioning of the auxiliary magazine. For different height tool magazines, revolving table 10 can be vertically adjusted. It is likely that other modifications and improvements will occur to the person skilled in the art which are within the scope of the appended claims.

What is claimed is:

1. An auxiliary magazine for use with electronically-driven machine tools especially for cutting and drilling centers, such machine tools having a machine-native tool magazine, said auxiliary magazine comprising:

a front end column;

tool storage means mounted on said front end column;

said tool storage means comprising two tool storage units mounted on a common revolving table, which table is rotatably attached to the front end column and is movable about a vertical axis;

means for selectively rotating said revolving table between tool exchange positions for each said tool storage unit; and stationary tool exchanger means extending from the side of the said front end column, said tool exchanger means comprising a tool exchanger having a guide shoe with means to rotate it about a vertical axis, said guide shoe having two mechanically movable tongs mounted on opposite sides of said guide shoe, said movable tongs being movable by contrarotation and being thereby adapted to interchange tools between a selected one off said tool storage units and the machine-native tool magazine.

2. The auxiliary magazine recited in claim 1, wherein:
said guide shoe on said tool exchanger features separate drives for said movable tongs and can be moved by rotation because it is mounted for rotation on a vertical hollow cylinder;
the hollow cylinder contains a rotary drive connected to said guide shoe and is attached to said front end column by means of carrier arm means.

3. The auxiliary magazine recited in claim 1, wherein each said tool storage unit consists of a revolving chain with a row of tool intake points and its own aggregate power source which selectively rotates its respective revolving chain.

4. The auxiliary magazine recited in claim 2, wherein each said tool storage unit consists of a revolving chain with a row of tool intake points and its own aggregate power source which selectively rotates its respective revolving chain.

5. The auxiliary magazine recited in claim 1, wherein said tool exchanger is positioned in front of a corner section of said front end column in juxtaposition with the tool exchange position with which each said tool storage unit is selectively aligned.

6. The auxiliary magazine recited in claim 2, wherein said tool exchanger is positioned in front of a corner section of said front end column in juxtaposition with the tool exchange position with which each said tool storage unit is selectively aligned.

7. The auxiliary magazine recited in claim 3, wherein said tool exchanger is positioned in front of a corner section of said front end column in juxtaposition with the tool exchange position with which each said tool storage unit is selectively aligned.

* * * * *